United States Patent
Kiel et al.

(10) Patent No.: US 12,351,402 B2
(45) Date of Patent: Jul. 8, 2025

(54) SCRAPER WITH AN EASILY REPLACEABLE SCRAPER ELEMENT

(71) Applicant: Cornelia Kill-Frech, Havixbeck (DE)

(72) Inventors: Martin Kiel, Recklinghausen (DE); Claus Weimann, Wetter (DE); Dirk Heidhues, Lippetal (DE)

(73) Assignee: Cornelia Kill-Frech, Havixbeck (DE)

( * ) Notice: Subject to any disclaimer, the term of this patent is extended or adjusted under 35 U.S.C. 154(b) by 71 days.

(21) Appl. No.: 18/020,382

(22) PCT Filed: Nov. 11, 2021

(86) PCT No.: PCT/EP2021/081412
§ 371 (c)(1),
(2) Date: Feb. 8, 2023

(87) PCT Pub. No.: WO2022/112017
PCT Pub. Date: Jun. 2, 2022

(65) Prior Publication Data
US 2023/0271789 A1 Aug. 31, 2023

(30) Foreign Application Priority Data

Nov. 27, 2020 (DE) ...................... 10 2020 131 557.0
Nov. 27, 2020 (DE) ...................... 10 2020 131 558.9

(51) Int. Cl.
*B65G 45/16* (2006.01)
*B65G 45/12* (2006.01)

(52) U.S. Cl.
CPC ............. *B65G 45/16* (2013.01); *B65G 45/12* (2013.01)

(58) Field of Classification Search
CPC .................................................. B65G 45/16
See application file for complete search history.

(56) References Cited

U.S. PATENT DOCUMENTS 3,749,438 A * 7/1973 Loomis ................... B66C 1/663
410/82
4,098,394 A   7/1978 Stahura
(Continued)

FOREIGN PATENT DOCUMENTS

CN        101528570 A    9/2009
CN        104768858 A    7/2015
(Continued)

OTHER PUBLICATIONS

IPSearch History Mar. 20, 2025 UTC; InnovationQ+; https://iq.ip.com/discover (Year: 2025).*

(Continued)

*Primary Examiner* — Gene O Crawford
*Assistant Examiner* — Abby A Jorgensen
(74) *Attorney, Agent, or Firm* — ICE MILLER LLP; Justin D. Swindells

(57) ABSTRACT

A scraper for a conveyor belt, a scraper module for same, a belt conveyor including same, and a method for replacing a scraper element on a scraper or belt conveyor. The scraper includes a system support with a scraper module having a base element arranged on the system support and a scraper element for contacting the conveyor belt. To allow a simple replacement of the scraper element, it is rotatably attached about a rotational axis relative to the base element by a rotational coupling, which is designed such that in a rotatable position of the scraper element within a fixed angular range, the scraper element is rigidly coupled to the base element in the direction of the rotational axis, and in a rotatable position of the scraper element within a release angular range, the scraper element can be released from the base element in the direction of the rotational axis.

15 Claims, 11 Drawing Sheets

(56) References Cited

U.S. PATENT DOCUMENTS

| | | | |
|---|---|---|---|
| 4,779,716 A | 10/1988 | Gordon | |
| 4,850,474 A * | 7/1989 | Schwarze | B65G 45/16 15/256.5 |
| 4,854,443 A | 8/1989 | Gordon | |
| 5,082,106 A * | 1/1992 | Schwarze | B65G 45/16 198/499 |
| 5,222,588 A | 6/1993 | Gordon | |
| 5,301,797 A * | 4/1994 | Hollyfield, Jr. | B65G 45/12 198/499 |
| 5,727,670 A | 3/1998 | Johnson | |
| 5,950,803 A | 9/1999 | Schwarze | |
| 6,296,105 B1 * | 10/2001 | Carnes | B65G 45/16 198/499 |
| 2018/0199698 A1 * | 7/2018 | Fiorello | A44B 99/005 |

FOREIGN PATENT DOCUMENTS

| | | | | |
|---|---|---|---|---|
| DE | 102013006821 A1 | | 7/2014 | |
| DE | 102014006281 A1 * | 11/2015 | | B08B 1/005 |
| DE | 102017114931 A1 * | 7/2018 | | B65G 45/16 |
| DE | 202020104666 U1 | | 8/2020 | |
| EP | 1280718 B1 | | 10/2009 | |
| JP | 58-56211 A | | 4/1983 | |
| JP | 63-41310 A | | 2/1988 | |
| RU | 2119884 C1 | | 10/1998 | |
| WO | WO-9408877 A1 * | 4/1994 | | B65G 45/16 |
| WO | WO-9519310 A1 * | 7/1995 | | B65G 45/16 |
| WO | WO-0170604 A1 * | 9/2001 | | B65G 45/12 |
| WO | WO-02068299 A1 * | 9/2002 | | B65G 45/16 |

OTHER PUBLICATIONS

International Search Report and Written Opinion of International Searching Authority for International Application No. PCT/EP2021/081412, with English translation of International Search Report, mailed Feb. 9, 2022 (10 pages).

* cited by examiner

Fig. 8d
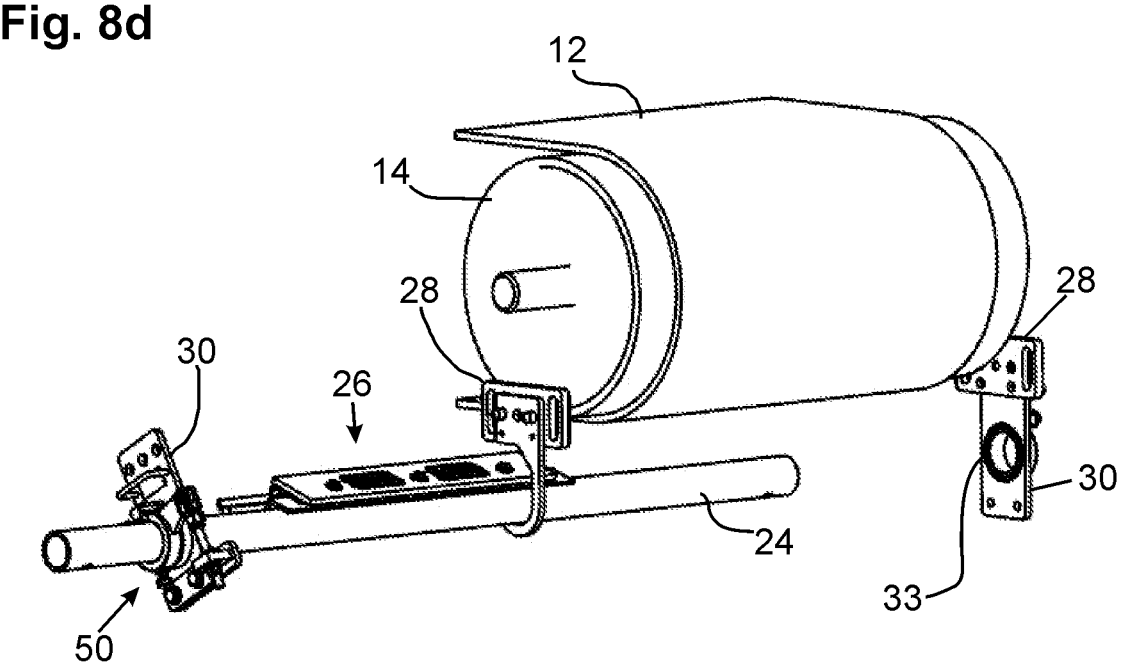
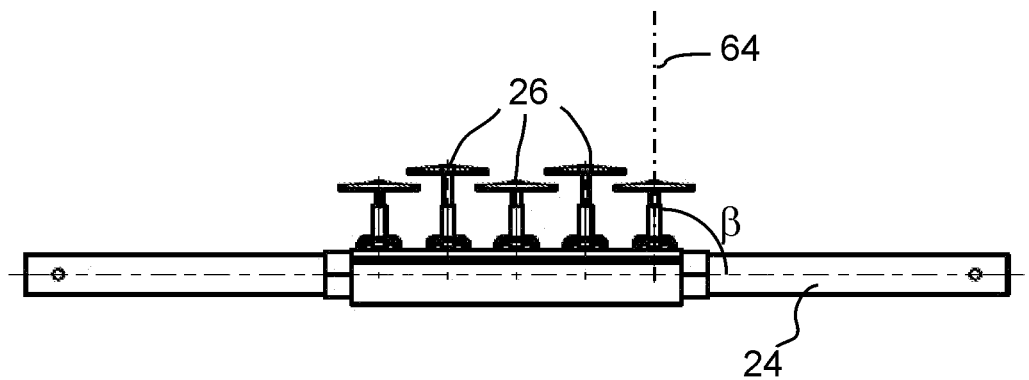
Fig. 8e

SCRAPER WITH AN EASILY REPLACEABLE SCRAPER ELEMENT

CROSS-REFERENCE TO RELATED APPLICATIONS

This application is a U.S. National Stage of International Application No. PCT/EP2021/081412, filed Nov. 11, 2021, which claims the benefit of German Patent Application No. 10 2020 131 557.0, filed Nov. 27, 2020, and German Patent Application No. 10 2020 131 558.9, filed Nov. 27, 2020, all of which are incorporated herein by reference in their entireties.

FIELD OF THE INVENTION

The invention relates to a scraper for a conveyor belt, to a scraper module therefor, to a belt conveyor equipped therewith and to a method for exchanging a scraper element.

BACKGROUND OF THE INVENTION

The use of scrapers is known for conveyor belts of belt conveyors which are deployed for conveying most diverse conveyed goods. By placing a scraper element against the running conveyor belt, any conveyed goods adhering thereto are scraped off. Known scraper systems have a system carrier aligned transversely to the running direction of the conveyor belt, on which system carrier a plurality of scraper modules with scraper elements are located.

DE 10 2013 006 821 A1 describes a belt scraper system made up of modules for the return region of conveyor belts. A system carrier is arranged transversely to the running direction of the conveyor belt. Multiple scraping modules are attached next to one another on the system carrier. The scraping modules each carry a scraper lamella which abuts against the belt in a peeling manner.

WO 95/19310 describes a device for scraping off contaminants from conveyor belts in conveyor belt systems. A system carrier is fastened to a bearing frame for the belt conveyor. A scraping element having a scraper lamella fastened to a lamella support is arranged such that it abuts against the belt conveyor in the operative position in a peeling manner. The scraping element has a torsion spring joint, on which the lamella support is guided in a pivoting and spring-loaded manner about a horizontal pivot axis such that when it encounters obstacles firmly adhering to the belt conveyor it can pivot away and then pivot back into the operative position. The lamella support is pivotably mounted by means of a rotary bearing with a limited angle of rotation such that the scraper lamella abutting against the belt webbing can adapt to the contour of the belt webbing by automatic rotation.

SUMMARY OF THE INVENTION

The scraper elements abutting against the conveyor belt during operation are subject to considerable wear during operation and have to be regularly changed and replaced. It can be regarded as an object to propose a scraper, a scraper module therefor, a belt conveyor herewith as well as a method for exchanging a scraper element on a scraper, which makes it possible to change the scraper elements simply.

The object is achieved by a scraper, a scraper module therefor, a belt conveyor and a method as disclosed herein. Advantageous embodiments of the invention are also disclosed herein.

The scraper according to the invention has at least one scraper module, preferably multiple scraper modules, on a system carrier. Each scraper module includes at least one base element arranged on the system carrier and one scraper element provided for contacting the conveyor belt. The scraper element can be, e.g., a scraping block made of a flexible material, in particular if the scraper is provided as a pre-scraper, i.e., for arrangement in the region of a deflection of the conveyor belt. The scraper can preferably be arranged in the return region of the conveyor belt. The scraper element more preferably has a scraping edge, particularly preferably made of metal, e.g., carbide. The scraper element can preferably abut against the conveyor belt in a peeling manner.

The base element of the scraper module can be attached to the system carrier in various ways and is preferably detachable. It is particularly preferably mounted to the system carrier by means of a clamping holding device.

According to the invention, the scraper element is attached with respect to the base element by means of a rotational coupling such that it can be rotated about a rotational axis. The rotational coupling is configured such that, depending on the rotational position of the scraper element with respect to the rotational axis, a different coupling results: in the case of a rotational position which lies within an angular range, which is referred to here as the fixed angular range, the scraper element—with respect to a movement in the direction of the rotational axis—is firmly coupled to the rest of the scraper module, i.e., in particular to the base element, whereas, in a rotational position within an angular range which is referred to here as the release angular range, in the direction of the rotational axis, it can be detached from the rest of the scraper module, i.e., in particular from the base element.

The rotational coupling thus ensures a rotatability of the scraper element about the rotational axis such that an alignment relative to the belt surface is possible and, thus, during operation, the scraper element has good contact with the conveyor belt and can follow the—e.g., slightly sagging—shape of the conveyor belt.

The rotational coupling further ensures, in the fixed angular range, a fixed coupling—in terms of a longitudinal movement in the direction of the rotational axis, i.e., in a rotational position in the fixed angular range, the scraper element can indeed be rotated, but cannot be detached from the base element. During a rotation of the scraper element such that the latter takes on a rotational position within the release angular range, the rotational coupling by contrast releases the scraper element such that the latter can be detached, can preferably be pulled off—e.g., for service purposes—in the direction of the rotational axis.

The fixed angular range and the release angular range can preferably be selected such that the scraper element during operation, i.e., with the scraper element abutting against the conveyor belt, is constantly in the fixed angular range and there is sufficient distance from the release angular range such that the latter is not reached during operation with sufficient certainty, i.e., a rotating of the scraper element into the release angular range is prevented by the contact with the conveyor belt. The fixed angular range can, e.g., be selected such that a horizontal alignment of the scraper element or an alignment of the scraper element parallel to the system carrier lies within the fixed angular range, preferably at least substantially centrally. This position can be assumed to be the middle position, wherein the fixed angular range extends, starting from the middle position, preferably at least over +/−30°, more preferably at least over +/−40° and, particularly preferably, at least over+/−60°. Therefore, the release angular range particularly preferably only starts on strong twisting about the rotational axis of, e.g., 90°+/−20° such that the firm coupling constantly remains ensured in all of the operative positions which are to usually be expected.

On the other hand, the scraper element can be detached, for maintenance purposes, in a particularly simple manner from the base element and, therefore, from the system carrier, by simply rotating it about the rotational axis so far until the release angular range is reached. The scraper element can then preferably be pulled off in the direction of the rotational axis, without having to release further connections.

As a result, a scraper results, which has an easily changeable scraper element which can be realized with a very simple construction. The rotatability about the rotational axis is utilized twice, namely on the one hand to align the scraper element during operation and, on the other hand, to detach the scraper element if the latter is to be changed. The scraper element can preferably be rotated manually and without tools.

In order to change, i.e., to replace, e.g., a worn scraper element with a new scraper element, it is sufficient to rotate the old scraper element into the release angular range (for which reason, it may possibly be necessary beforehand to bring the system carrier into a position in which the scraper element has a sufficient distance from the conveyor belt in order to enable the rotation). The scraper element can then be detached from the base element and a new scraper element, positioned in a rotational position within the release angular range, can be attached to, e.g., inserted into, the base element, and can thereafter be rotated into a rotational position within the fixed angular range for locking.

The rotational coupling can be realized in various ways in order to fulfil the function according to the invention. According to a preferred embodiment, it has an engagement element and an insertion opening therefor which are configured such that the engagement element can be guided through the insertion opening, in a first rotational position which lies within the release angular range, and the engagement element can be locked to the insertion opening in a second rotational position which lies within the fixed angular range. The insertion opening and its rim can be part of the base element or can be attached to the latter and the engagement element can be provided on the side of the scraper element or vice versa.

The engagement element can particularly preferably be arranged on a shaft which can be inserted into an insertion sleeve, wherein the insertion opening is formed within the insertion sleeve. A rim of the insertion opening can be configured projecting inwardly into the insertion sleeve. The shaft is preferably connected to the scraper element, e.g., firmly and immovably attached with respect to the latter, while the insertion sleeve is fixed to the base element. The rotatability of the scraper element is preferably ensured by a rotatability of the shaft within the insertion sleeve. Preferably, the shaft and/or the insertion sleeve and, particularly preferably, also the rotational axis can extend at least substantially perpendicular to a scraping edge of the scraper element, or at least at an angle δ of more than 45°, preferably 60° or greater.

The rotational axis is also preferably arranged at least substantially perpendicular relative to the system carrier, or at least at an angle β of more than 60°. Therefore, viewed from above or from below, the rotational axis extends preferably at least substantially parallel to the running direction of the conveyor belt. Observed from the side, i.e., horizontally and transversely to the running direction of the conveyor belt, the rotational axis can enclose a relatively small angle γ of, e.g., 0-35° with the running direction of the conveyor belt, in preferred embodiments. However, alternative advantageous embodiments are also conceivable, in which the rotational axis is positioned considerably more steeply with respect to the running direction of the conveyor belt, i.e., at larger angles γ.

According to a preferred embodiment, the rotation of the scraper element about the rotational axis is slightly dampened or equipped with a deliberate sluggishness, such that no free rotation is effected during the influence, e.g., of only gravitational forces on the scraper element. By contrast, the rotational coupling runs so smoothly that during the influence of forces as they arise due to contact of the scraper element with the conveyor belt, a free rotation and alignment of the scraper element are made possible. Due to the targeted dampening or sluggishness, the installation of the scraper element is facilitated because it is thus possible to predefine a desired alignment of the scraper element, e.g., by manual rotation, without this altering in an undesired manner. In the case of the preferred configuration of the rotational coupling having a shaft which can be inserted into an insertion sleeve, a dampening can be effected, e.g., by means of a friction element which is provided for contacting the shaft and/or an inside of the insertion sleeve in order to dampen a relative movement—in particular a rotation—between the shaft and insertion sleeve.

Furthermore, in the preferred case of the configuration of the rotational coupling with a shaft and an insertion sleeve, a sealing element for sealing between the shaft and an inside of the insertion sleeve can be provided in order to avoid the penetration of contaminants. The sealing element can preferably encompass the shaft completely, e.g., as an O-ring. In particular, the sealing element can also be utilized in order to achieve the desired dampening of the relative movement between the shaft and the insertion sleeve.

According to a further development of the invention, the scraper module can have a joint by means of which the scraper element can be pivoted with respect to the system carrier. A pivot axis of the joint can preferably be aligned at least substantially parallel to the system carrier. It is further preferred that a pivot axis of the joint is aligned at least substantially perpendicular to the rotational axis of the rotational coupling, or at least at an angle of at least 60° thereto. By pivoting the scraper element in the joint, a variable contact with the conveyor belt can preferably be achieved; the possibility of achieving a pivoting away of the scraper element from the belt surface by a pivot movement in the joint, in order to allow obstacles to pass, is in particular preferred.

A spring element can preferably be provided in order to apply a pressing force to the scraper element in the direction of the conveyor belt. Thus, a resilient contact of the scraper element with the conveyor belt can be achieved. The use of any type of spring element, e.g., as a torsion spring, spiral spring, tension or compression spring, etc., is essentially possible for this. The use of a rubber torsion spring which is more preferably arranged in the joint is particularly preferred.

According to an advantageous embodiment, a stop is provided for the pivot movement of the scraper element in the joint. As a result, the movement of the scraper element in the direction of the conveyor belt can in particular be limited. The stop is preferably positioned such that, in the stop position, there is still a bias in the direction of the surface of the conveyor belt.

The scraper element can preferably be connected via a scraper arm to the joint, wherein the rotational coupling is formed on the scraper arm.

The scraper module according to the invention is provided as part of the described scraper and includes at least the base element, the scraper element and the rotational coupling.

When the scraper is deployed on a belt conveyor according to the invention, the system carrier is aligned transversely to the conveyor belt and the scraper element—or preferably a plurality of scraper elements—abuts/abut against the conveyor belt.

BRIEF DESCRIPTION OF THE DRAWINGS

Embodiments of the invention are described in greater detail below, with reference to drawings, wherein:

FIGS. 8*a*-8*e* show perspective views of various positions of parts of the scraper according to the first embodiment during the extraction of the system carrier.

DETAILED DESCRIPTION OF EMBODIMENTS

Figure 1:
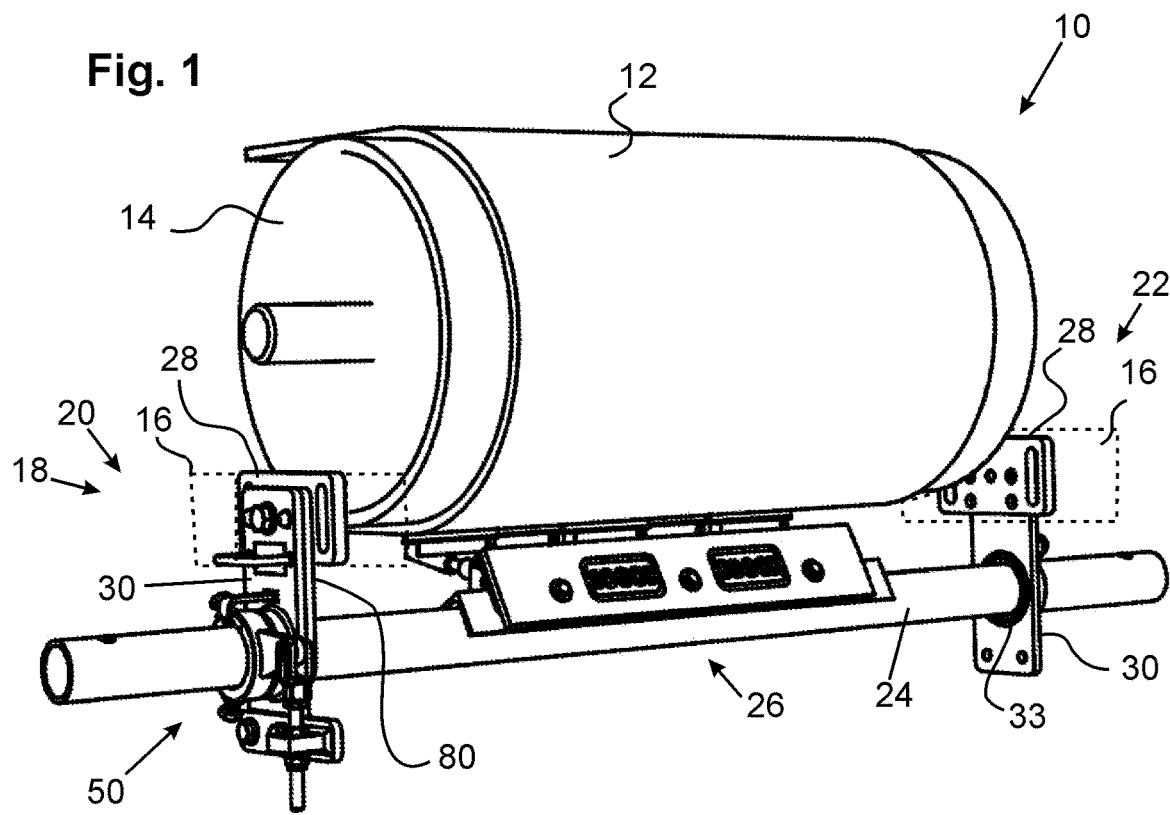
FIGS. 1, 2 show perspective views of a part of a belt conveyor having a conveyor belt and a scraper according to a first embodiment.
Figure 2:
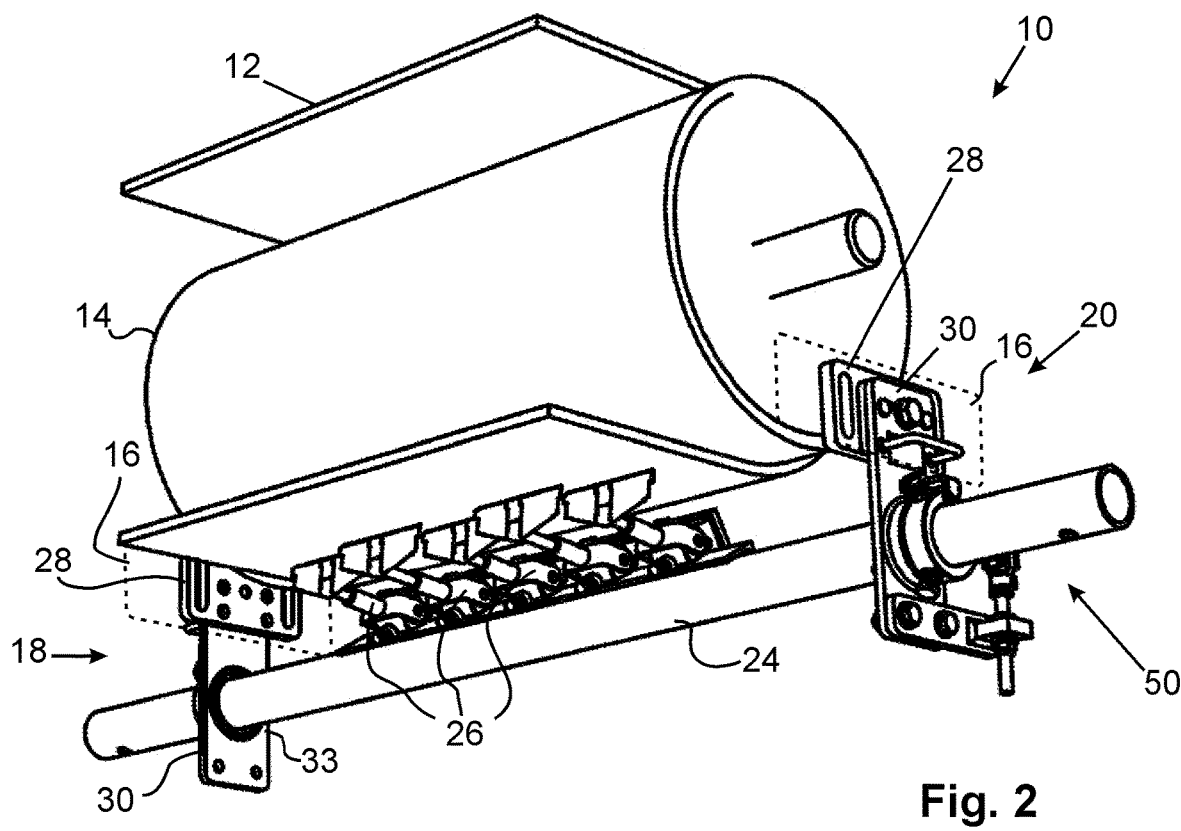

FIGS. 1 and 2 show perspective views, for a first embodiment, of a part of a belt conveyor 10 having a conveyor belt 12 which is deflected around a tripper pulley 14. A shaft of the tripper pulley is mounted on a belt scaffold 16, only parts of which are depicted schematically here.

On the belt conveyor 10, a scraper 18 having a plurality of scraper modules 26 is provided with a system carrier 24 and a holding device 20 and counter support 22 for attachment to the belt scaffold 16.

The holding device 20 and the counter support 22 each have an attachment part which is fastened to the belt scaffold 16 or is part of the belt scaffold 16, here in each case in the form of attachment plates 28. A holding element in the form of a holding plate 30 is in each case attached to the attachment plates 28.

In the embodiment shown, the system carrier 24 is a tube of a continuous round cross-section. The holding plates 30 each have round recesses with plastic sliding bushes 33 inserted therein, in which the system carrier 24 is rotatably mounted.

Figure 3:
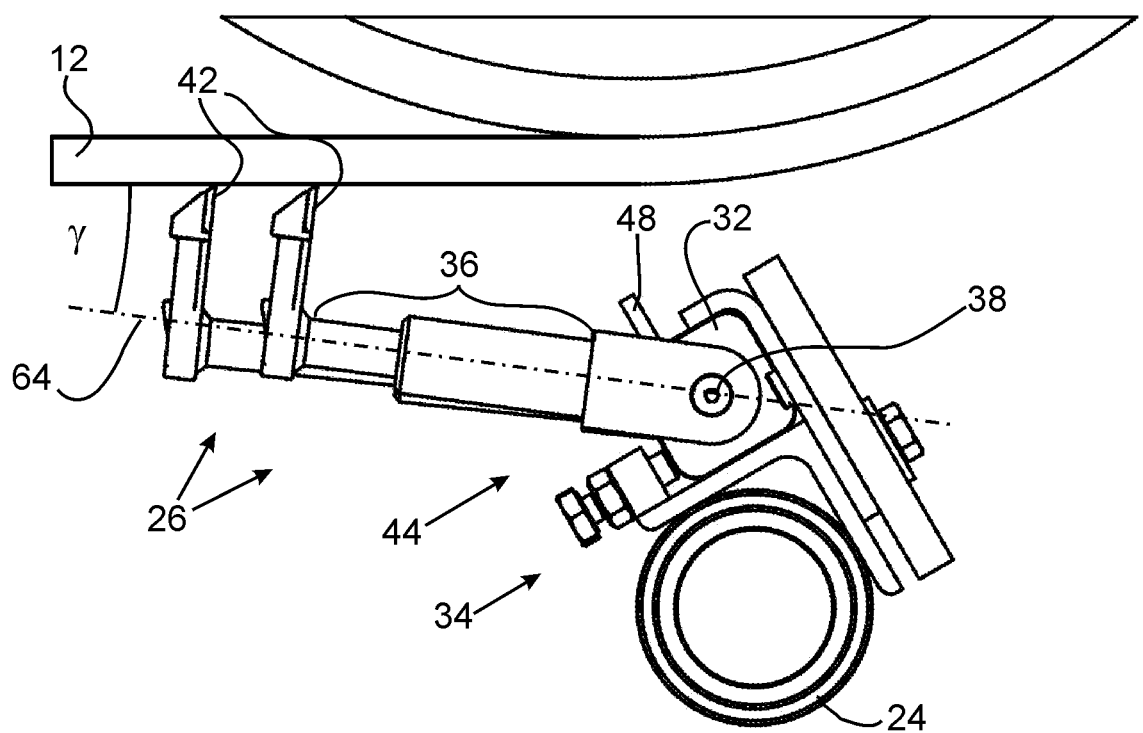
FIG. 3 shows a side view of the scraper from FIGS. 1, 2.

In FIG. 3, two scraper modules 26 are depicted in a side view. The scraper modules 26 each include a base element 32 which is detachably attached to the system carrier 24 in a clamping holding device 34. A scraper arm 36 is attached to the base element 32 so as to be pivotable about a pivot axis 38. A scraping element holder 40 having a scraping element 42 is in each case arranged at the end of the scraper arm 36.

As can be seen, e.g., from FIG. 2, multiple scraper modules 26 are arranged next to one another on the system carrier 24. The system carrier 24 extends in the direction of the width of the conveyor belt 12, that is to say transversely to the running direction thereof. In the case of the first embodiment, scraper modules 26 arranged next to one another each have in alternation shorter and longer scraper arms 36 such that the scraper elements 42 are arranged in two staggered rows, wherein viewed in the running direction of the conveyor belt, a slight overlapping between the scraper elements 42 of the two rows is provided constantly. The scraper modules 26 are positioned next to one another such that the rows extend at least substantially over the entire width of the conveyor belt 12.

During the operation of the belt conveyor 10 and of the scraper 18, edges of the scraper elements 42, as shown in FIG. 3, abut against the surface of the conveyor belt 12 in a peeling manner, in the example shown in the return region of the conveyor belt 12. The scraper elements 42 are resiliently pressed against the surface of the conveyor belt 12. Contaminants and adherent conveyed goods are thus scraped off from the running conveyor belt 12 by the scraper elements 42.

Figure 4:
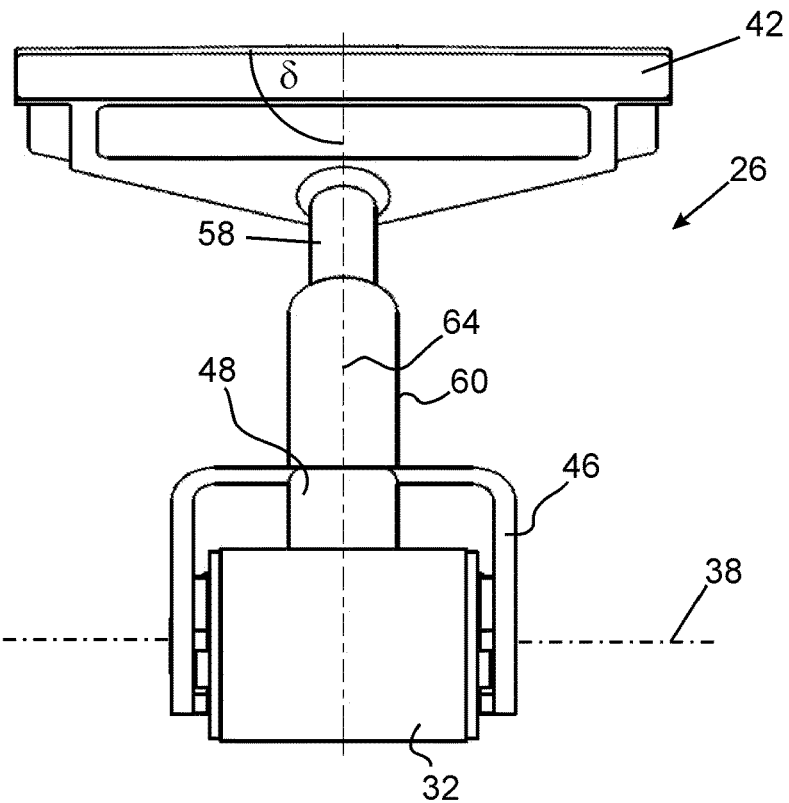
FIGS. 4, 5 show a scraper module of the scraper from FIGS. 1-3 in a top view as well as in a partially cut-away side view.
Figure 5:
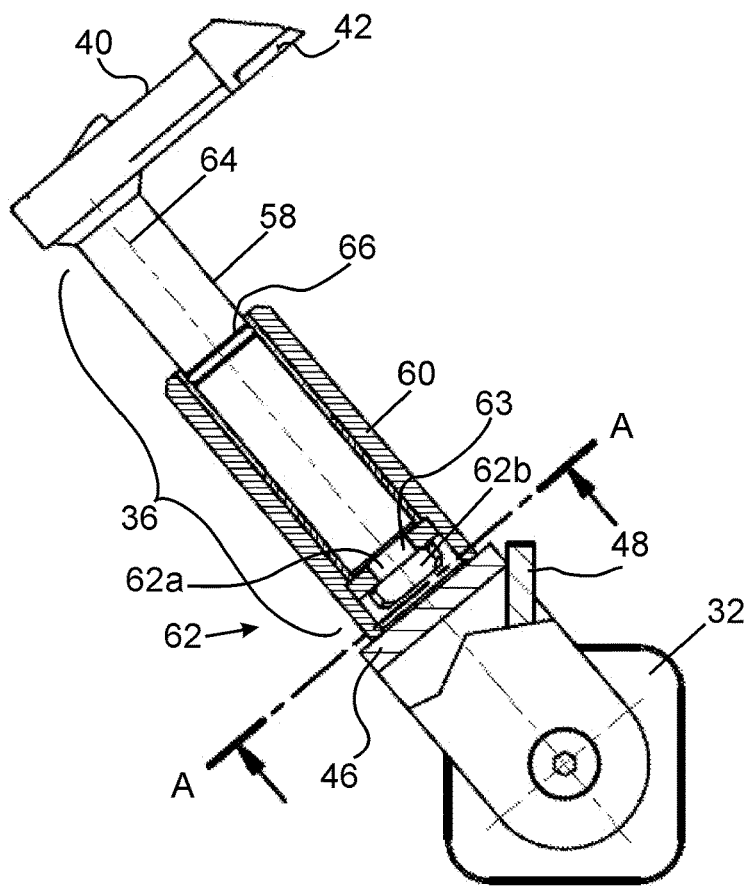

In FIGS. 4, 5, one of the scraper modules 26 is depicted in greater detail. As shown there, a joint 44 is provided between the base element 32 and the scraper arm 36 such that the scraper arm 36 can be pivoted about a pivot axis 38. As depicted, the joint 44 includes a stirrup 46 encompassing the base element 32.

A rubber torsion spring (not depicted), which applies torque to the scraper arm 36, acts in the interior of the joint 44.

A projecting tab is provided as a stop 48 on the base element 32. In a stop position, a part of the stirrup 46 rests against the stop 48 such that the scraper arm 36 cannot pivot further about the pivot axis 38. The rubber torsion spring is configured such that it acts upon the scraper arm 36 in the direction of the stop, wherein a bias 48 of the spring prevails in the stop position depicted in FIG. 5.

Due to the effect of the respective springs of the scraper modules 26, the scraper elements 42 are pressed against the surface of the conveyor belt 12, but can take evasive action by pivoting in the joints 44 during the influence of corresponding forces during operation, e.g., due to stationary belt damage, elevations or similar on the surface of the conveyor belt 12 by a corresponding pivot movement of the scraper arm 36 about the pivot axis 38 against the effect of the spring.

A bias of the entire scraper 18, with which the entirety of the scraper elements 42 is pressed against the conveyor belt 12, is predefined by presetting a rotational position of the system carrier 24. Therefor, a tensioning device 50 is provided on the holding device 20 between the holding plate 30 and the system carrier 24.

Figure 1A:
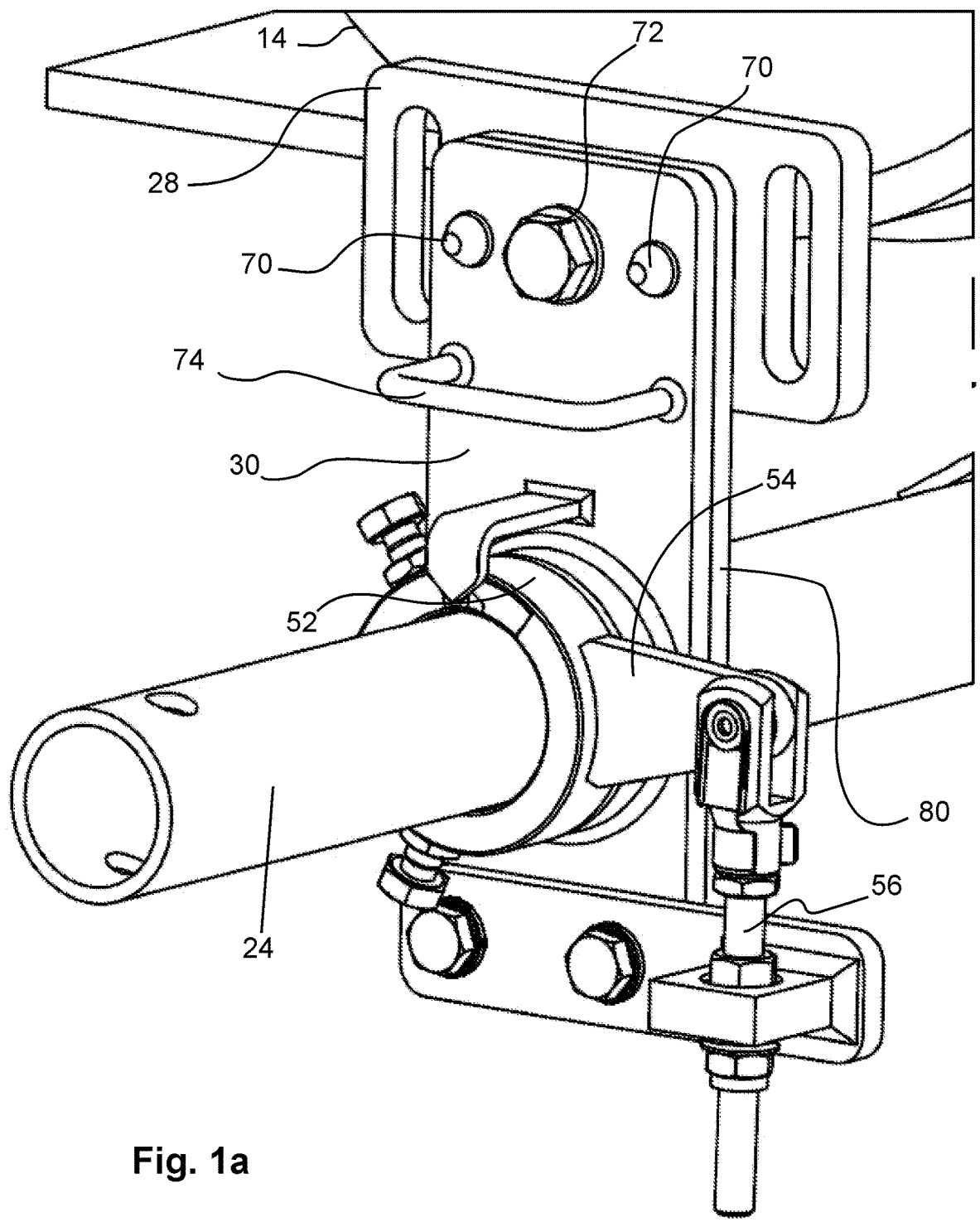
FIG. 1*a* shows an enlarged perspective view of a holding device from FIG. 1.

FIG. 1a shows the holding device 20 in an enlarged representation. A clamping ring attached to the system carrier 24 has a tensioning arm 54 projecting radially from the system carrier 24, which can be tensioned by means of a tensioning screw 56 with respect to an attachment firmly attached to the holding plate 30. By adjusting the tensioning screw 56, the system carrier 24 can thus be rotated and a bias of the springs of the scraper modules 26 can be adjusted.

As is further shown in FIGS. 1, 1a, a plate-shaped supporting element 80, which is arranged in the embodiment shown between the attachment plate 28 and the holding plate 30, is in addition attached to the attachment plate 28 of the holding device 20. The shape and function of the supporting element 80 are explained in greater detail below, with regard to FIGS. 8a-8d and FIG. 10.

During the operation of the scraper 18, there is continuous wear on the scraper elements 42 such that regular inspection and maintenance are required. The scraper 18 is designed in terms of its attachment to the belt scaffold 16 as well as in terms of the attachment of the scraper elements 42 to the scraper modules 26 to be maintained in a particularly simple manner.

Figure 7:
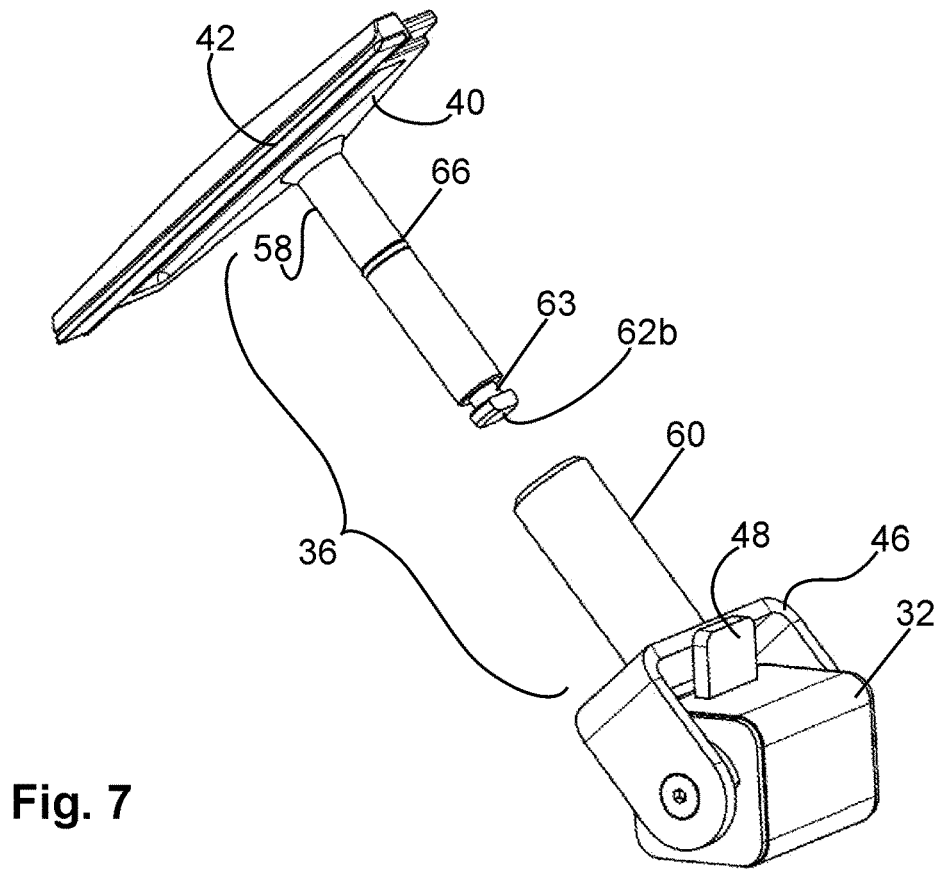
FIG. 7 shows a perspective view of the scraper module from FIGS. 4, 5 having a detached scraper element.

As is evident in particular from FIGS. 4, 5 and 7, the scraper arm 36 includes two elements which are detachably fastened to one another, namely a shaft 58 attached to the scraper element holder 40 and a sleeve 60 connected to the base element 32, namely fastened to the stirrup 46 of the joint 44. The shaft 58 is inserted into the sleeve 60 (FIG. 5) and is secured by means of a twist lock 62 in the direction of a longitudinal axis 64 of the scraper arm 36.

The longitudinal axis 64 extends in the embodiment shown, as is obvious from FIGS. 2 and 3, in a vertical view parallel to the running direction of the conveyor belt 12 and thus also perpendicular, i.e., at an angle β of 90° (see FIG. 8e), to the longitudinal axis of the system carrier 24. In a horizontal view from the side (FIG. 3), the longitudinal axis 64 extends at an angle γ of approx. 9° to the running direction of the conveyor belt 12. The longitudinal axis 64 in the embodiment shown is further aligned perpendicular, i.e., at an angle δ of 90°, to the contact edge of the scraping element 42 (see FIG. 4).

The shaft 58 can be freely rotated inside the sleeve 60 about the longitudinal axis 64, which is why the longitudinal axis 64 is also referred to as the rotational axis. However, a sealing ring 66 is provided which, on the one hand, causes a sealing of the inner space of the sleeve 60 with respect to the shaft 58 and which, on the other hand, due to friction because of the contact with the inner side of the sleeve 60 creates a certain sluggishness of the movement of the shaft 58 with respect to the sleeve 60.

The twist lock 62 includes on the side of the sleeve 60 an elongated window 62a arranged in the interior, which has a rim which projects into the interior of the sleeve 60, and includes on the side of the shaft 58 an elongated plate-shaped engagement element 62b which is firmly attached to the end of the shaft 58 on an extension 63 having a smaller diameter.

Figure 6:
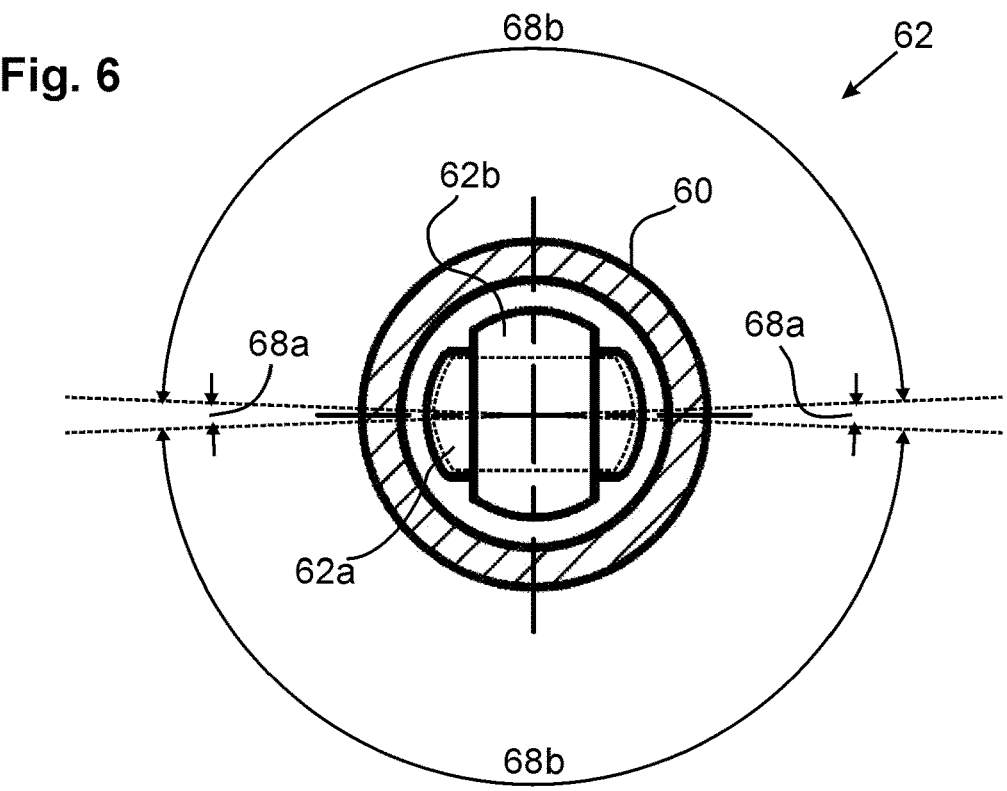
FIG. 6 shows a cross-section through the scraper module from FIG. 5 along the line A . . . A.

As is obvious in particular from the cross-sectional view in FIG. 6, the engagement element 62b and the window 62a are formed such that the engagement element 62b, when aligned parallel to the window 62a (dashed representation), can be inserted through the latter in the direction of the longitudinal axis 64, while it is locked in a twisted position with respect to the parallel alignment as shown (solid line) at the rim of the window 62a.

Hence, there is a dependence on the rotational position in terms of the fixing of the shaft 58 to the sleeve 60 in the axial direction of the longitudinal axis 64:

In a position of the engagement element 62b parallel to the window 62a (dashed representation), the shaft 58 with the scraper element 42 and the scraper element holder 40 attached thereto is located in a position inside a release angular range 68a. In a rotational position in the release angular range, the twist lock 62 is released and the shaft 58 can be freely displaced in the longitudinal direction with respect to the sleeve 60.

When the shaft 58 is further twisted with respect to the sleeve 60, the ends of the engagement element 62b engage behind the rim of the window 62a such that the shaft 58 is fixed in the longitudinal direction with respect to the sleeve 60. The corresponding rotational positions of the shaft 58 are within a fixed angular range 68b, in which the twist lock 62 is locked.

As depicted, the release angular range 68a is centered around the rotational position shown dashed in FIG. 6, in which the front edge of the scraper element 42 provided for abutting against the conveyor belt 12 is at 90° to the longitudinal direction of the system carrier 24 and to the pivot axis 38 of the scraper module 26. By contrast, the fixed angular range 68b is centered around a rotational position which is rotated by 90° against this and shown in FIG. 6 with a solid line. In this rotational position, the edge of the scraper element 42 is aligned parallel to the longitudinal direction of the system carrier 24 and to the pivot axis 38 of the joint 44.

Due to the free rotatability of the shaft 58 inside the sleeve 60, the respective scraper element 42 can, during contact with the conveyor belt 12, align itself according to the contour thereof. In practice, this will not be constantly planar over the entire belt width but will curve, e.g., towards the edges. Due to the contact pressure, the scraper element holders 40 are constantly positioned such that the scraper elements 42 follow the shape of the conveyor belt 12.

However, a rotational position which lies within the release angular range 68a is not achieved in any operative situation. The twist lock 62 thus constantly remains in the fixed angular range during the contact of the scraper element 42 with the conveyor belt 12 and thus ensures the fastening to the base element 32 of the respective scraper modules 26.

In order to enable work on the scraper 18 and the scraper modules 26, in particular to make it possible to change the unit comprising the scraper element 42, scraper element holder 40 and shaft 28, the system carrier 24 with the scraper modules 26 attached thereto can be detached in a particularly simple way and extracted laterally, as explained below with regard to FIGS. 8a to 8e.

Therefor, on the side of the holding device 20, a particular attachment of the holding plate 30 to the attachment plate 28 is provided and, on the side of the counter support 22, a bearing of the system carrier 24 in the bearing bush 33 of the holding plate 30 is provided such that the latter is freely movable in its longitudinal direction.

As depicted in FIG. 1a, the holding plate 30 is fixed to the attachment plate 28 of the holding device 20 by two plug connections 70 and a screw connection 72. The plug connections 70 are formed by two bolts arranged in parallel at a distance from one another on the attachment plate 28, which are received such that they precisely fit in bores of the holding plate 30. The plug connections 70 can be detached by pulling off the holding plate 30 from the attachment plate 28 in the longitudinal direction of the system carrier 24.

The screw connection 72 formed between the plug connections 70 includes a screw aligned parallel to the bolts, with which screw the holding plate 30 is screwed to the attachment plate 28.

In an operative arrangement for operating the belt conveyor 10 and the scraper 18, the holding plate 30 is fixed to the attachment plate 28 by means of the screw connection 72.

If operation is interrupted, parts of the scraper 18 to be maintained can be extracted by transferring the scraper 18 into an assembly arrangement. By releasing the screw connection 72, the holding plate 30 can be detached from the attachment plate 28 by subsequently also detaching the plug connections 70a, 70b by pulling in the direction of the longitudinal axis of the system carrier 24. A handle 74 is provided for this.

Figure 8A:
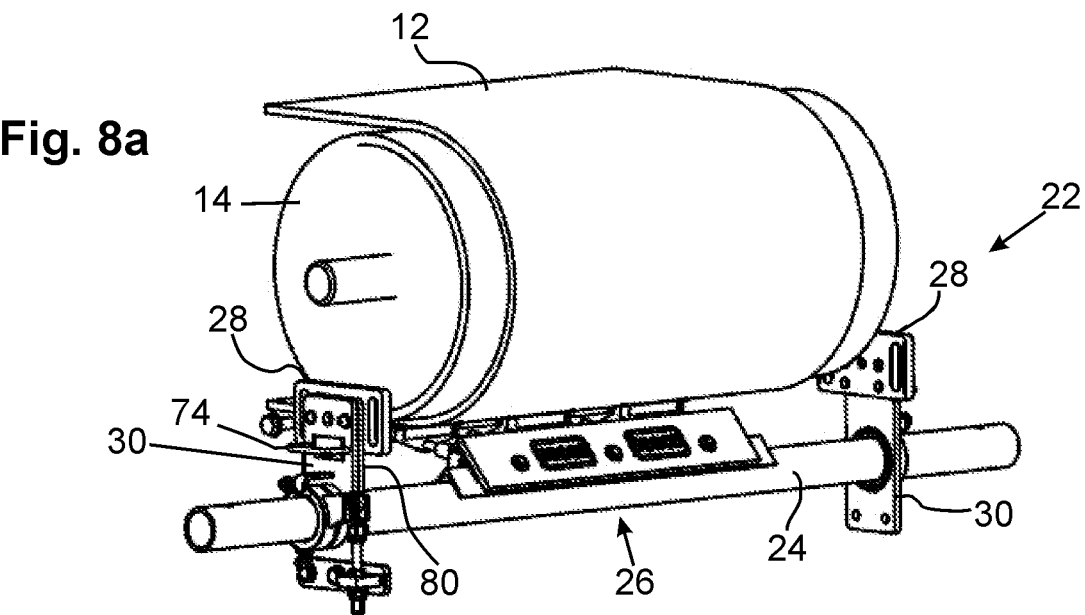

FIG. 8a shows, starting from the operative arrangement, first of all releasing of the screw connection 72. The holding plate 30 is subsequently removed from the attachment plate 28, together with the system carrier 24 in the longitudinal direction thereof, wherein the plug connections 70a, 70b are detached.

As already mentioned, the holding device 20 between the attachment plate 28 and the holding plate 30 includes the supporting element 80. The supporting element 80 has, as is obvious from FIG. 8b, a hook-shaped holding portion 82 extending in the direction of the system carrier 24 and partially encompassing the latter, which configures a recess 86. The holding portion 82 and the recess 86 have, as shown, an (in this case round) inner contour in certain sections corresponding to the (in this case round) outer contour of the system carrier 24. The holding portion 82 is arranged in the operative arrangement, i.e., if the holding plate 30 is fastened to the attachment plate 28 such that it does not touch the system carrier 24, but remains at a certain distance of a few millimeters therefrom. Above the holding portion 82, the supporting element 80 has a cutout 84 through which the system carrier 24 passes.

Figure 10:
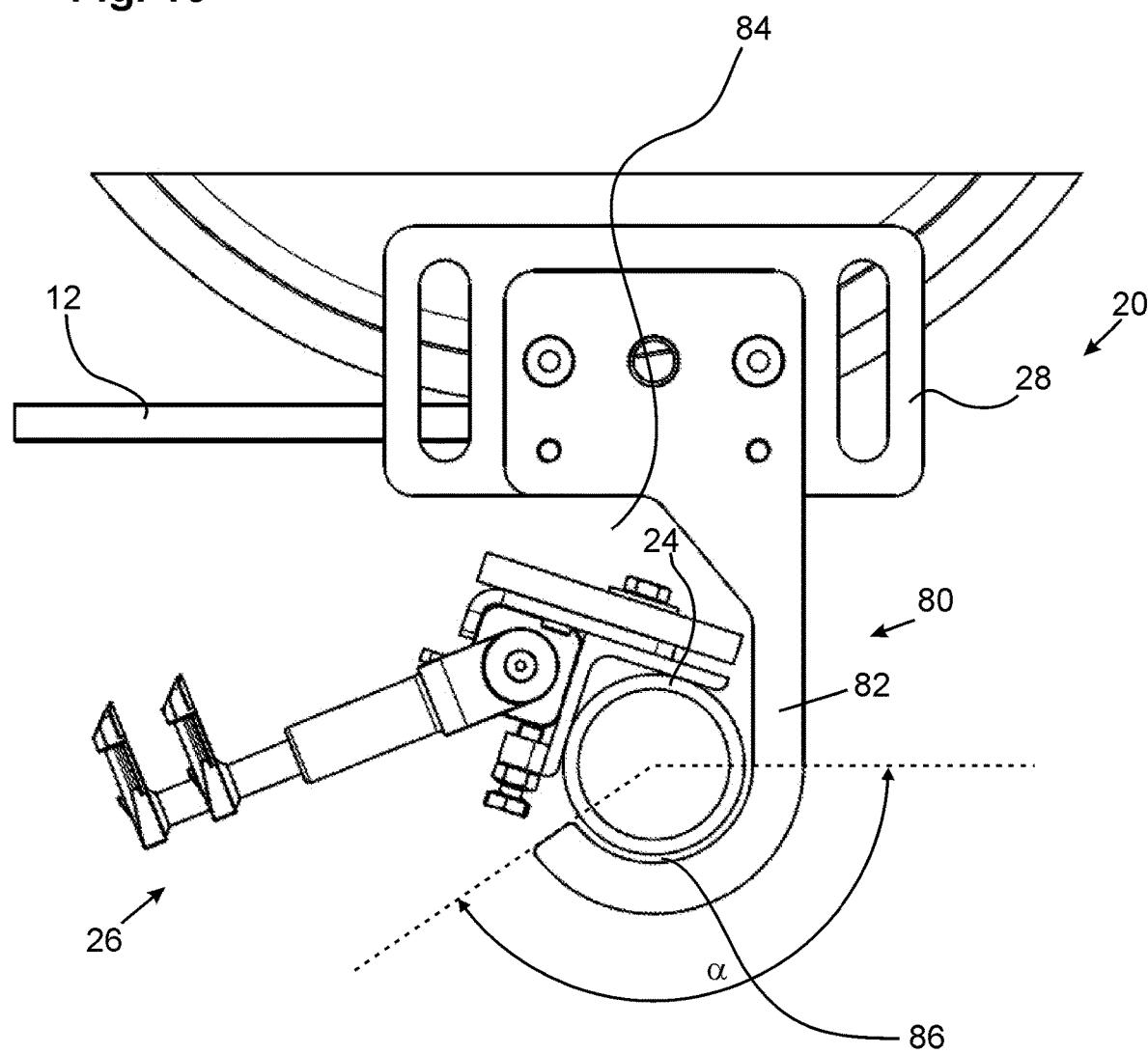
FIG. 10 shows a cross-sectional view along line B . . . B from FIG. 8*b*.
Figure 11:
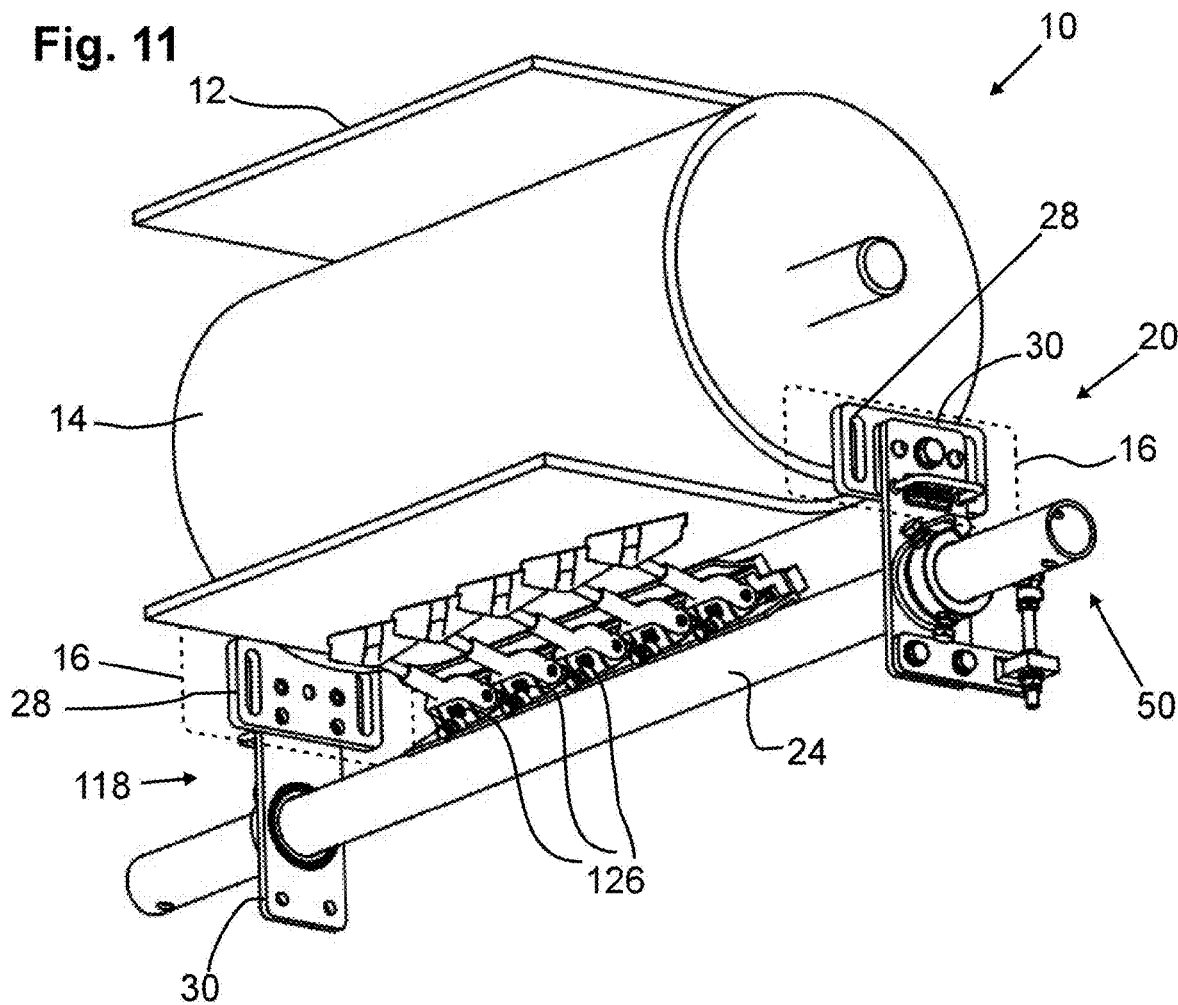
FIG. 11 shows a perspective view of a part of a belt conveyor having a conveyor belt and a scraper according to a second embodiment.

In the assembly arrangement, i.e., following the detaching of the screw connection 72 and of the plug connections 70a, 70b (FIG. 8b), the system carrier 24 sinks slightly and thereafter rests on the holding portion 82 of the supporting element 80 in the recess 86. After detaching the connection between the holding plate 30 and the attachment plate 28, the supporting element 80 thus takes over the holding of the system carrier 24. As depicted, the supporting element 80 is fastened to the attachment plate 28 and thus to the belt scaffold 16. As depicted in FIG. 10, the holding portion 82 encompasses the system carrier 24 over a circumferential region a of approx. 135° at the recess 86 and supports the system carrier 24 from below such that the latter does not drop.

Figure 8B:
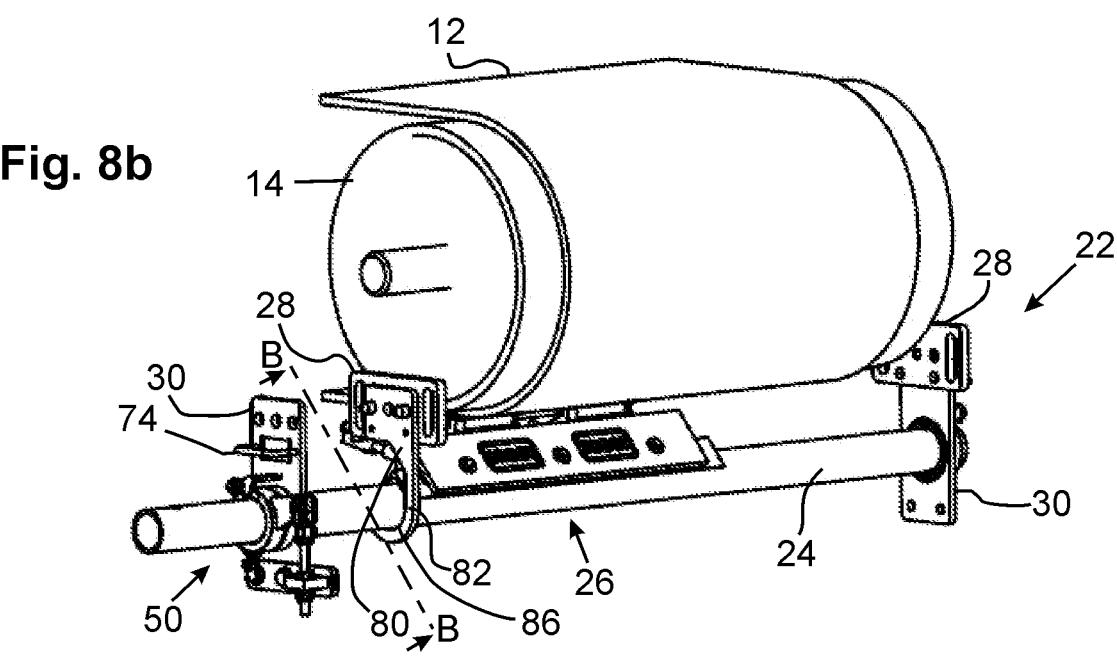
Figure 8C:

In the further course, the system carrier 24 is now pulled out in the direction of its longitudinal axis together with the holding plate 30 and the tensioning device 50 (FIG. 8b). In the process, the supporting element 82 supports the system carrier 24 such that the latter does not drops down. Due to the displaceability of the system carrier 24 in the bearing bush 33 of the counter support 22, it is possible to pull it out particularly easily.

The scraper modules 26 can pass the attachment plate 28 and the supporting element 80, because the hook-shaped form of the holding portion 82 which only partially encompasses the system carrier 24 with the cutout 84 leaves sufficient free space such that when the system carrier 24 is pulled out, the scraper modules 26 can be transferred into an extracted position outside of the belt region (FIG. 8d). The scraper modules 26 can thus be guided through a free area in the plane of the supporting element 80 as well as the attachment plate 28, without striking. The cutout 84 of the supporting element 80 forms part of the free area.

In the extracted position, the scraper modules 26 are easily accessible and can be inspected as well as maintained. In particular, worn scraper elements 42 can be replaced by detaching the respective units made up of the scraper element 42, scraper element holder 40 and shaft 58 of the respective scraper module as described above by twisting them about the rotational axis 64, by separating them by pulling off them in the longitudinal direction and by subsequently attaching new elements in the same way.

Thus, the process of inspecting and maintaining the scraper 18 is made particularly easy. In the embodiment shown, it is possible to pull out the system carrier 24 together with the scraper modules 26 laterally by simply releasing a single screw (screw connection 72). Due to the support provided by means of the supporting element 80, this can be carried out by a single person.

Figure 9A:
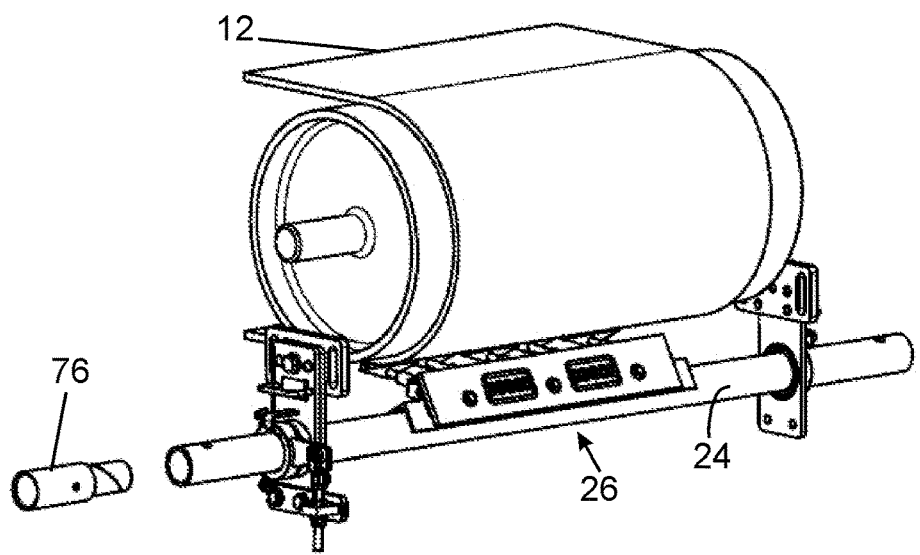
FIGS. 9*a*-9*c* show perspective views of the scraper according to the first embodiment when using an extraction aid.
Figure 9B:
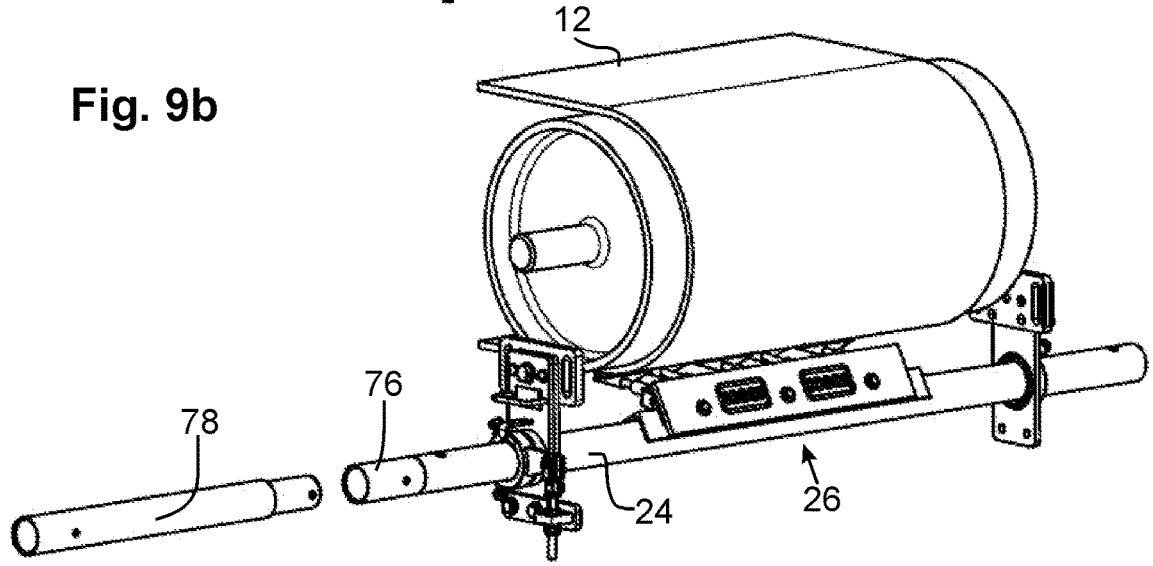
Figure 9C:
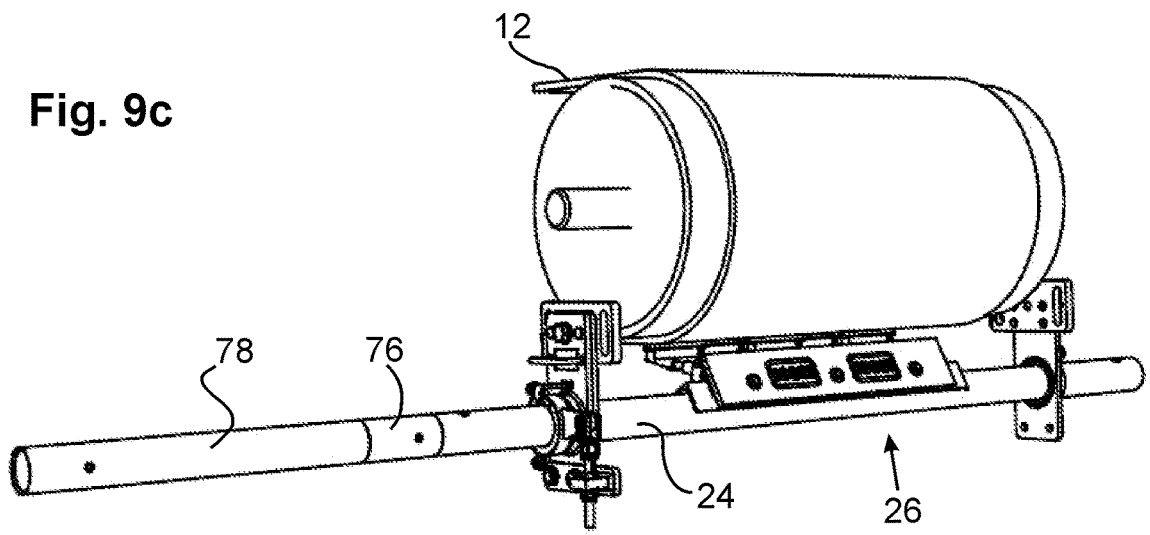

If there is sufficient space available to the side of the conveyor belt 12, the handling of the system carrier 24 can be made even easier when it is pulled out by using an extraction aid. For this purpose, as shown in FIG. 9a, an adapter 76 can first be fitted laterally onto the system carrier 24 and clamped on or otherwise fixed thereto. A tube can subsequently be attached to the adapter 76, which tube serves as an extraction aid 78 and is attached in extension of the system carrier 24. By means of the extraction aid 78, the system carrier 24 can be handled particularly well, in particular in connection with the support on the holding portion 82 of the supporting element 80.

A scraper 118 according to a second embodiment is shown in FIGS. 11-14. The scraper 118 according to the second embodiment corresponds, in numerous details, to the scraper 18 according to the first embodiment such that only the differences are explained in greater detail below and reference is made in other respects to the aforementioned description. The same reference numerals denote elements that corresponds between the embodiments.

Whereas, in the case of the scraper 18 according to the first embodiment as described and depicted the scraping elements 42 are arranged in two rows, the scraper 118 according to the second embodiment includes a single-row arrangement of scraping elements 42 on scraper modules 126 which are each of identical length and which are arranged next to one another on the system carrier 24.

Figure 12:
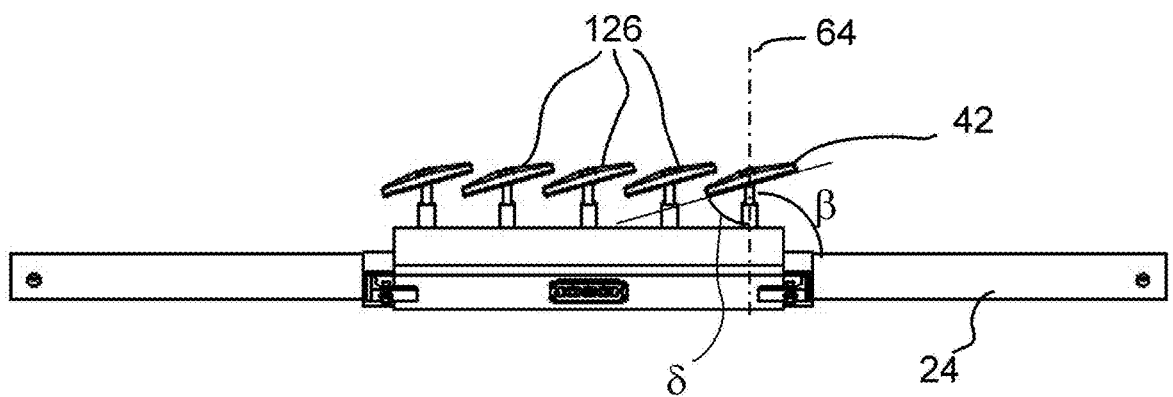
FIG. 12 shows a top view of a system carrier of the scraper from FIG. 11.

As is particularly obvious from FIG. 12, the scraping edges of the scraper elements 42 are not aligned in the transverse direction of the conveyor belt 12, as in the case of the first embodiment, but obliquely thereto at an angle which, in the depicted example, is approx. 15°. However, the scraper arms 36 extend with their longitudinal axis 64, as in the case of the first embodiment, in the longitudinal direction of the conveyor belt 12, i.e., as in the case of the first embodiment, at an angle of β of 90°.

The scraper elements 42 are attached obliquely at an angle δ of approx. 75° to the scraper arms 36. Adjacent scraper modules 126 on the system carrier 24 are arranged so closely that—viewed in the longitudinal direction of the conveyor belt 12—a slight overlapping of the scraper elements 42 arises, thus resulting in a scraping effect over the entire belt width.

In other respects, the scraper 118 according to the second embodiment is identical in terms of structure and function to the scraper 18 according to the first embodiment, i.e., in common with the scraper 18, each scraper 118 includes the base element 32 which is detachably attached to the system carrier 24 in the clamping holding device 34 as well as the scraper arm 36 which is attached pivotably about a pivot axis 38 and at each end of which a scraping element holder 40 having a scraping element 42 is arranged. The biased torsion spring imparts a torque such that, during the operation of the scraper 118, the scraping edges of the scraper elements 42 abut against the surface 12 of the conveyor belt 12 in a peeling manner and are resiliently pressed against the surface 12 thereof in order to scrape off contaminants. If there are stationary obstacles on the surface of the conveyor belt 12, the scraping elements 42 can take evasive action due to a pivot movement of the scraper arm 36 about the pivot axis 38 against the effect of the spring.

Figure 13:
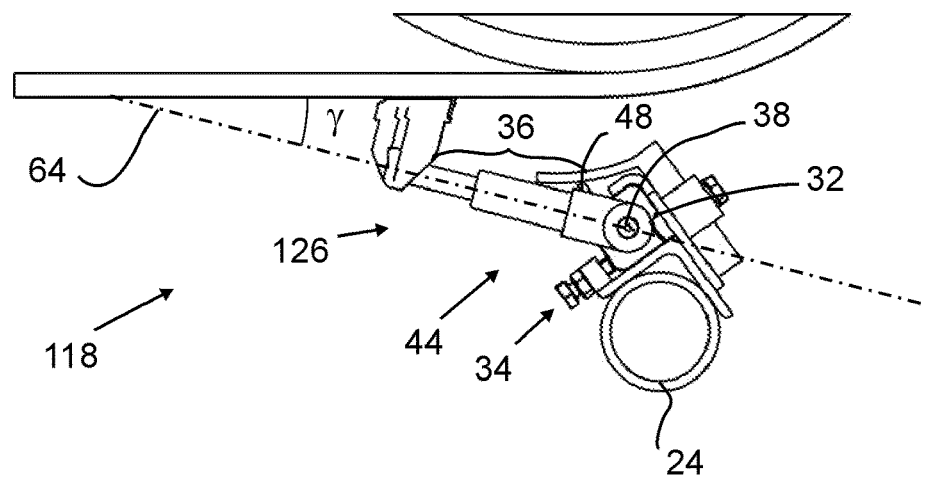
FIG. 13 shows a side view of the scraper from FIGS. 11, 12.
Figure 14:
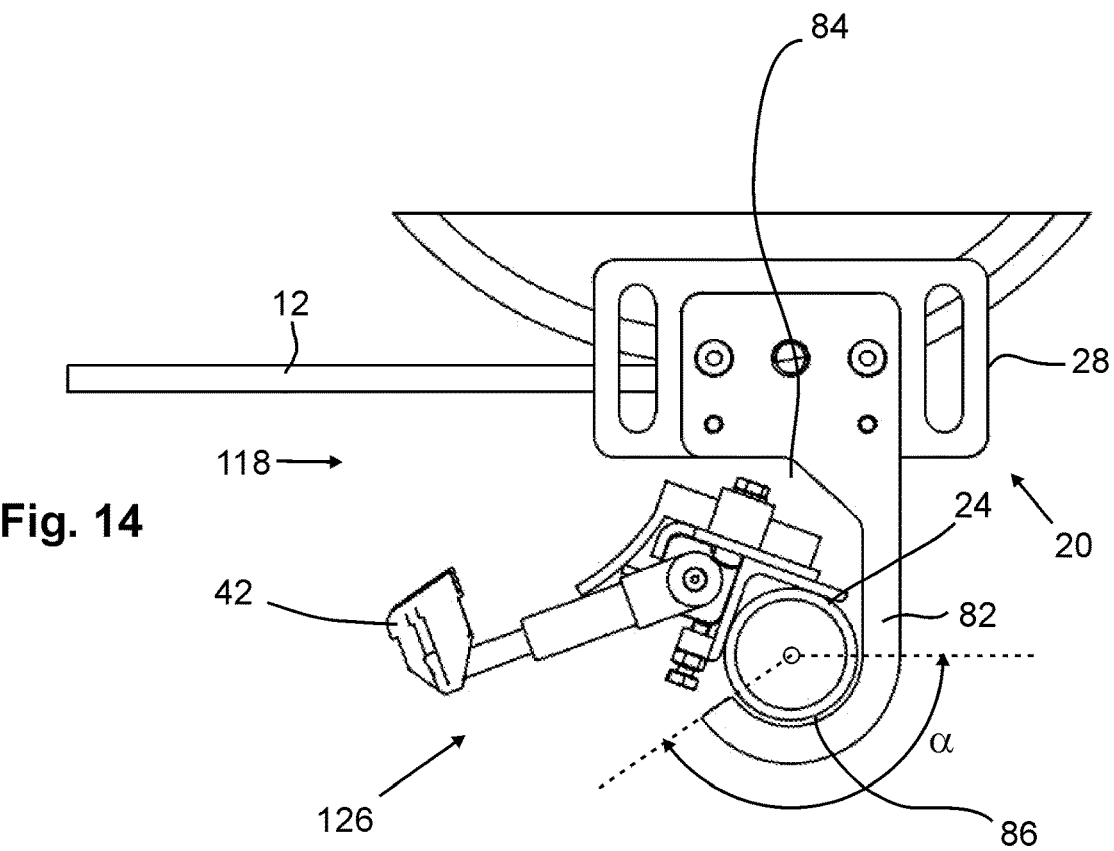
FIG. 14 shows a view similar to FIG. 10 for the scraper from FIGS. 11-13 according to the second embodiment.

FIG. 13 shows, for the second embodiment, a horizontal view from the side, in which the angle γ between the running direction of the conveyor belt 12 and the longitudinal axis 64 can be seen. Depending on the arrangement and setting, the angle γ can be, e.g., between 0° and 20°; in the embodiment shown, the angle γ is approx. 15°.

In the case of the second embodiment as well, the scraper arm 36 includes the shaft 58 attached to the scraper element holder 40, which shaft is inserted into the sleeve 60 and can be rotated about the longitudinal axis 64 therein. It is ensured by means of the twist lock 62 that the shaft 58 can only be pulled out of the sleeve 60 or inserted into the latter at the corresponding alignment, i.e., rotation from the normal position defined by the belt contact 60.

The invention claimed is:

1. A scraper for a conveyor belt, having
a system carrier with at least one scraper module,
wherein the scraper module has a base element arranged on the system carrier and a scraper element for abutting against the conveyor belt,
wherein the scraper element is rotatably attached with a rotational coupling about a rotational axis with respect to the base element, wherein the rotational coupling is configured such that,
in a rotational position of the scraper element within a fixed angular range, the scraper element is firmly coupled to the base element in the direction of the rotational axis to allow free bidirectional rotation of the scraper element within the fixed angular range while following a contour of the conveyor belt and maintaining alignment relative to the base element without, during said free bidirectional rotation, separating the scraper element from the base element even as external forces act upon the scraper element,
and in a rotational position of the scraper element within a release angular range, the scraper element can be detached from the base element in the direction of the rotational axis.

2. The scraper according to claim 1, in which
the rotational coupling has an insertion opening and an engagement element which are configured such that the engagement element in a rotational position within the release angular range can be guided through the insertion opening and the engagement element is locked to the insertion opening in a rotational position within the fixed angular range.

3. The scraper according to claim 2, in which
the engagement element is arranged on a shaft which can be inserted into an insertion sleeve, wherein the insertion opening is formed within the insertion sleeve,
wherein a rim of the insertion opening is configured projecting inwardly into the insertion sleeve.

4. The scraper according to claim 3, in which the shaft or the insertion sleeve is firmly connected to the scraper element.

5. The scraper according to claim 1, in which the rotational axis has an angle (B) of more than 60° with respect to the system carrier.

6. The scraper according to claim 1, in which the fixed angular range extends, starting from a middle position, at least over+/−30°.

7. The scraper according to claim 1, in which
the rotational coupling has a shaft which can be inserted into an insertion sleeve,
wherein a friction element for abutment against the shaft and/or an inside of the insertion sleeve is provided in order to dampen a relative movement between the shaft and insertion sleeve against one another.

8. The scraper according to claim 1, in which
the rotational coupling has a shaft which can be inserted into an insertion sleeve,
wherein a sealing element is provided for sealing between the shaft and an inside of the insertion sleeve.

9. The scraper according to claim 1, in which
the scraper module has a joint, wherein the scraper element can be pivoted in the joint with respect to the system carrier.

10. The scraper according to claim 9, in which
a spring element is provided in order to act upon the scraper element in the direction of the conveyor belt.

11. The scraper according to claim 9, in which
the scraper element is connected via a scraper arm to the joint,
wherein the rotational coupling is formed on the scraper arm.

12. The scraper according to claim 9, in which
a stop is provided for the pivot movement of the scraper element.

13. A scraper module for a conveyor belt scraper, having
a base element and a scraper element, wherein the scraper element is rotatably attached with a rotational coupling about a rotational axis with respect to the base element,
wherein the rotational coupling is configured such that
in a rotational position of the scraper element within a fixed angular range, the scraper element is firmly coupled to the base element with respect to a movement in the direction of the rotational axis to allow free bidirectional rotation of the scraper element within the fixed angular range while following a contour of the conveyor belt and maintaining alignment relative to the base element without, during said free bidirectional rotation, separating the scraper element from the base element even as external forces act upon the scraper element,
and in a rotational position of the scraper element within a release angular range, the scraper element can be detached from the base element in the direction of the rotational axis.

14. A belt conveyor, having
a conveyor belt,
and a scraper including a system carrier with at least one scraper module,
wherein the scraper module has a base element arranged on the system carrier and a scraper element for abutting against the conveyor belt,
wherein the scraper element is rotatably attached with a rotational coupling about a rotational axis with respect to the base element, wherein the rotational coupling is configured such that, in a rotational position of the scraper element within a fixed angular range, the scraper element is firmly coupled to the base element in the direction of the rotational axis to allow free bidirectional rotation of the scraper element within the fixed angular range while following a contour of the conveyor belt and maintaining alignment relative to the base element without, during said free bidirectional rotation, separating the scraper element from the base element even as external forces act upon the scraper element, and in a rotational position of the scraper element within a release angular range, the scraper element can be detached from the base element in the direction of the rotational axis, wherein the system carrier is aligned transversely to the conveyor belt and the scraper element abuts against the conveyor belt.

15. A method for exchanging a scraper element on a scraper, in which the scraper includes a system carrier with at least one scraper module, wherein the scraper module has a base element arranged on the system carrier and a scraper element for abutting against the conveyor belt, wherein the scraper element is rotatably attached with a rotational coupling about a rotational axis with respect to the base element, wherein the rotational coupling is configured such that, in a rotational position of the scraper element within a fixed angular range, the scraper element is firmly coupled to the base element in the direction of the rotational axis to allow free bidirectional rotation of the scraper element within the fixed angular range while following a contour of the conveyor belt and maintaining alignment relative to the base element without, during said free bidirectional rotation, separating the scraper element from the base element even as external forces act upon the scraper element, and in a rotational position of the scraper element within a release angular range, the scraper element can be detached from the base element in the direction of the rotational axis, wherein the system carrier is brought into a position in which the scraper element is a sufficient distance from the conveyor belt such that it can be rotated into a rotational position within the release angular range, the scraper element is detached from the base element, a new scraper element, positioned in a rotational position within the release angular range, is attached to the base element and is rotated into a rotational position within the fixed angular range.

* * * * *